(12) United States Patent
Yamashita et al.

(10) Patent No.: US 9,599,463 B2
(45) Date of Patent: Mar. 21, 2017

(54) OBJECT DETECTION DEVICE

(71) Applicant: ALPS ELECTRIC CO., LTD., Tokyo (JP)

(72) Inventors: Tatsumaro Yamashita, Miyagi-ken (JP); Yoshihiro Someno, Miyagi-ken (JP)

(73) Assignee: ALPS ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 14/873,012

(22) Filed: Oct. 1, 2015

(65) Prior Publication Data
US 2016/0265906 A1 Sep. 15, 2016

(30) Foreign Application Priority Data

Mar. 10, 2015 (JP) .................. 2015-047191

(51) Int. Cl.
*G01B 11/24* (2006.01)
*G01B 11/25* (2006.01)
(52) U.S. Cl.
CPC ................ *G01B 11/2513* (2013.01)
(58) Field of Classification Search
CPC ....... G01N 21/6452; G01N 2021/7786; G01N 21/645; G01N 21/77; G01N 2021/6463; G01N 21/00; G01N 21/648; G01N 21/4788; G01N 15/0205; G01N 15/10; G01N 15/1434; G01N 15/1459; G01N 21/53; G01N 21/538
See application file for complete search history.

(56) References Cited

U.S. PATENT DOCUMENTS

| | | | | |
|---|---|---|---|---|
| 7,554,624 B2 | 6/2009 | Kusuda et al. | | |
| 2013/0038882 A1* | 2/2013 | Umeda | ..................... | G01C 3/08 356/610 |
| 2013/0050710 A1* | 2/2013 | Yamaguchi | .............. | G01C 3/08 356/610 |
| 2014/0307057 A1* | 10/2014 | Kang | ........................ | H04N 5/33 348/47 |
| 2015/0381972 A1* | 12/2015 | Kowdle | ............... | H04N 9/3191 348/51 |
| 2016/0134851 A1* | 5/2016 | Grundhofer | ........... | G01B 11/25 348/745 |

FOREIGN PATENT DOCUMENTS

| | | |
|---|---|---|
| JP | 2005/064451 | 7/2005 |
| JP | 2006-528770 | 12/2006 |
| JP | 5001286 B | 5/2012 |
| JP | 2012237604 | * 12/2012 |

* cited by examiner

Primary Examiner — Michael P Stafira
(74) Attorney, Agent, or Firm — Beyer Law Group LLP

(57) ABSTRACT

An object detection device includes at least one light source, an irradiation optical system configured to irradiate a measured object with light emitted from the light source, a light reception element configured to image reflected light reflected by the measured object, and a detection unit configured to detect the measured object based on the reflected light received by the light reception element, and the irradiation optical system includes conversion means for converting the light emitted from the light source into a plurality of regular patterns.

14 Claims, 7 Drawing Sheets

OBJECT DETECTION DEVICE

CLAIM OF PRIORITY

This application claims benefit of Japanese Patent Application No. 2015-047191 filed on Mar. 10, 2015, which is hereby incorporated by reference.

BACKGROUND OF THE INVENTION

1. Field of the Invention

The present invention relates to an object detection device that irradiates a measured object with measurement light having a dot pattern, and detects the measured object based on reflected light.

2. Description of the Related Art

In Japanese Patent No. 5001286, an invention relating to an object detection device that detects a measured object using a coherent light source has been described.

In the object detection device described in Japanese Patent No. 5001286, an illumination region is irradiated with a random speckle pattern generated from the coherent light source, and light response from the illumination region is detected by an imaging unit. A difference in a speckle pattern between a pattern image obtained when the measured object moves to the illumination region and a reference image of the random speckle pattern when there is no measured object is detected, and a three-dimensional map of the measured object is built using a three-dimensional measurement method.

In the object detection device described in Japanese Patent No. 5001286, it is necessary to increase density of the dot pattern so as to detect a shape of the measured object in greater detail. However, when the density of the dot pattern increases, the number of dots for detection increases and accordingly, a processing load increases. Further, when movement of the measured object is detected using such a high-density dot pattern, processing does not keep up with a moving speed of the measured object due to a large number of detection dots. Accordingly, there is a problem in that, for example, the moving speed cannot be detected. Thus, in the object detection device, an optimum dot pattern varies depending on an item to be measured. However, in the object detection device of the related art, the optimal dot pattern according to each item cannot be prepared.

SUMMARY OF THE INVENTION

Therefore, the present invention provides an object detection device capable of irradiating a measured object with measurement light having a plurality of patterns according to a plurality of detection items. Further, the present invention provides an object detection device capable of simultaneously irradiating a plurality of dot patterns.

(1) The object detection device according to an aspect of the present invention includes at least one light source, an irradiation optical system configured to irradiate a measured object with light emitted from the light source, a light reception element configured to image reflected light reflected by the measured object, and a detection unit configured to detect the measured object based on the reflected light received by the light reception element, in which the irradiation optical system includes conversion means for converting the light emitted from the light source into a plurality of regular patterns.

Thus, since light having an optimum pattern can be used for each detection item, it is possible to perform a detection process with high detection accuracy for each item without applying an excessive processing load. Since the measured object can be simultaneously irradiated with light having different patterns, it is possible to efficiently perform detection of the measured object.

(2) In the object detection device according to the aspect of the present invention, it is preferable that the plurality of patterns are all dot patterns, and dots constituting the patterns have different characteristic values.

Thus, since a plurality of patterns can be clearly discriminated, it is possible to accurately perform the detection of the measured object.

(3) In the object detection device according to the aspect of the present invention, it is preferable that the plurality of patterns include a dot pattern and a line pattern.

Thus, since an optimal pattern can be selected for a detection item, it is possible to improve detection accuracy.

(4) In the object detection device according to the aspect of the present invention, it is preferable that dots of the dot pattern and lines of the line pattern have different characteristic values.

Thus, since the dot pattern and the line pattern can be clearly discriminated, it is possible to accurately perform the detection of the measured object.

(5) In (2) or (4), it is preferable that the characteristic value is at least one of luminance, a dot diameter, a shape, brightness, hue, a wavelength, and a phase.

Thus, identification of the pattern can be easily and reliably performed according to measurement conditions or the like.

(6) In the object detection device according to the aspect of the present invention, it is preferable that the number of light sources is 1, and the conversion means includes a diffraction grating configured to diffract incident light.

(7) In (6), it is preferable that the object detection device further includes light splitting means for splitting the light emitted from the light source, in which the light split by the light splitting means is respectively incident on a plurality of diffraction gratings.

By generating a plurality of patterns for each split light, a degree of freedom of the generated patterns and characteristic values thereof increases. Accordingly, it is possible to generate an optimum pattern for a detection item.

(8) In (7), it is preferable the light splitting means includes a beam splitter.

(9) In (6), it is preferable that the diffraction grating diffracts incident light to generate a plurality of different dot patterns.

Since a plurality of patterns can be generated by one diffraction grating, it is possible to realize a simple and small device.

(10) In the object detection device according to the aspect of the present invention, it is preferable that the number of light sources is 2, and the conversion means includes two diffraction gratings configured to diffract incident light from the two light sources, respectively.

Since a plurality of patterns are generated for each light source, a degree of freedom of the generated patterns and characteristic values thereof increases. Accordingly, it is possible to generate an optimum pattern for a detection item.

(11) In (10), it is preferable that the diffraction grating includes a holographic element.

According to the aspect of the present invention, it is possible to provide the object detection device capable of irradiating the measured object with measurement light having a plurality of patterns according to a plurality of detection items, such as the shape and the movement information of the measured object. Further, according to the aspect of the present invention, it is possible to provide the object detection device capable of simultaneously irradiating a plurality of dot patterns.

DESCRIPTION OF THE PREFERRED EMBODIMENTS

Hereinafter, an object detection device according to embodiments of the present invention will be described in detail with reference to the drawings.

First Embodiment

Figure 1:
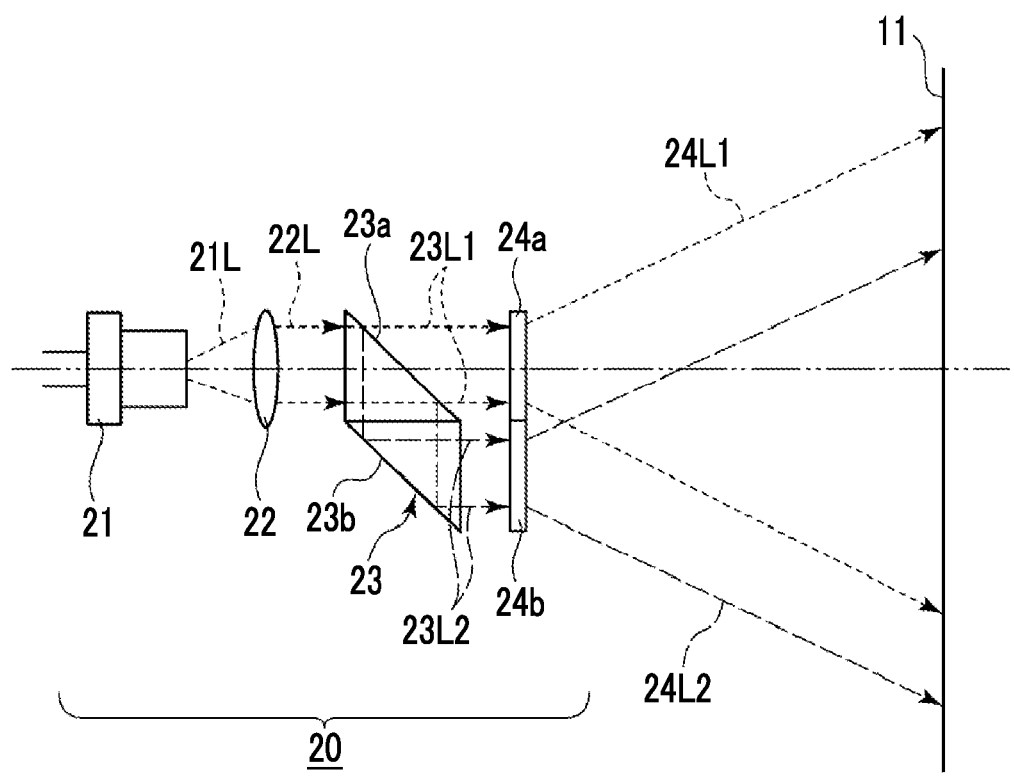
FIG. 1 is a plan view illustrating a light source and an irradiation optical system in a first embodiment.
Figure 2:
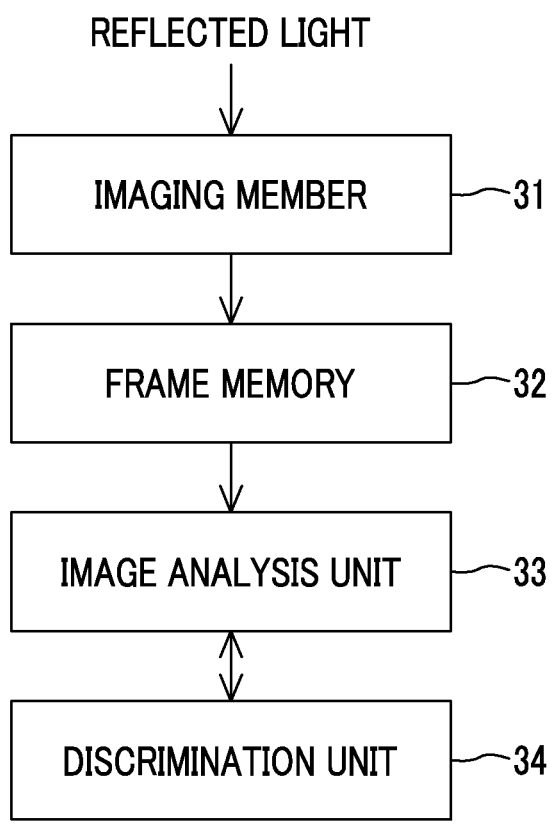
FIG. 2 is a block diagram illustrating a configuration in which an imaging member including a light reception element, a frame memory, an image analysis unit, and a discrimination unit are included in the first embodiment.

An object detection device according to a first embodiment includes an irradiation optical system 20 and a reference surface 11 illustrated in FIG. 1, and an imaging member 31, a frame memory 32, an image analysis unit 33, and a discrimination unit 34 illustrated in FIG. 2. While the reference surface 11 illustrated in FIG. 1 is a plane, the reference surface 11 may be an uneven surface. In FIG. 1, X-Y-Z coordinates are shown as reference coordinates. An X-Y plane is a plane parallel to the reference surface 11, and an X-Z plane is a plane perpendicular to the reference surface 11.

The irradiation optical system 20 includes a laser light source 21 that is a coherent light source, a collimating lens 22 that converts a divergent light beam 21L emitted from the laser light source 21 into a parallel light beam 22L, a beam splitter 23 that splits the parallel light beam 22L converted by the collimating lens 22 into two light beams, and two transmission-type holographic elements 24a and 24b on which the two parallel light beams 23L1 and 23L2 split by the beam splitter 23 are respectively incident.

The laser light source 21 emits laser light in a near infrared wavelength region which is not visible to a person. Alternatively, the laser light source 21 may be a laser light source which emits visible laser light.

The beam splitter 23 includes a half mirror 23a, and a total reflection mirror 23b. The half mirror 23a transmits light of a portion of the parallel light beam 22L incident from the collimating lens 22, emits the light as a parallel light beam 23L1, and reflects remaining light to the total reflection mirror 23b. The total reflection mirror 23b totally reflects the incident light from the half mirror 23a and emits the light as a parallel light beam 23L2.

Figure 3:
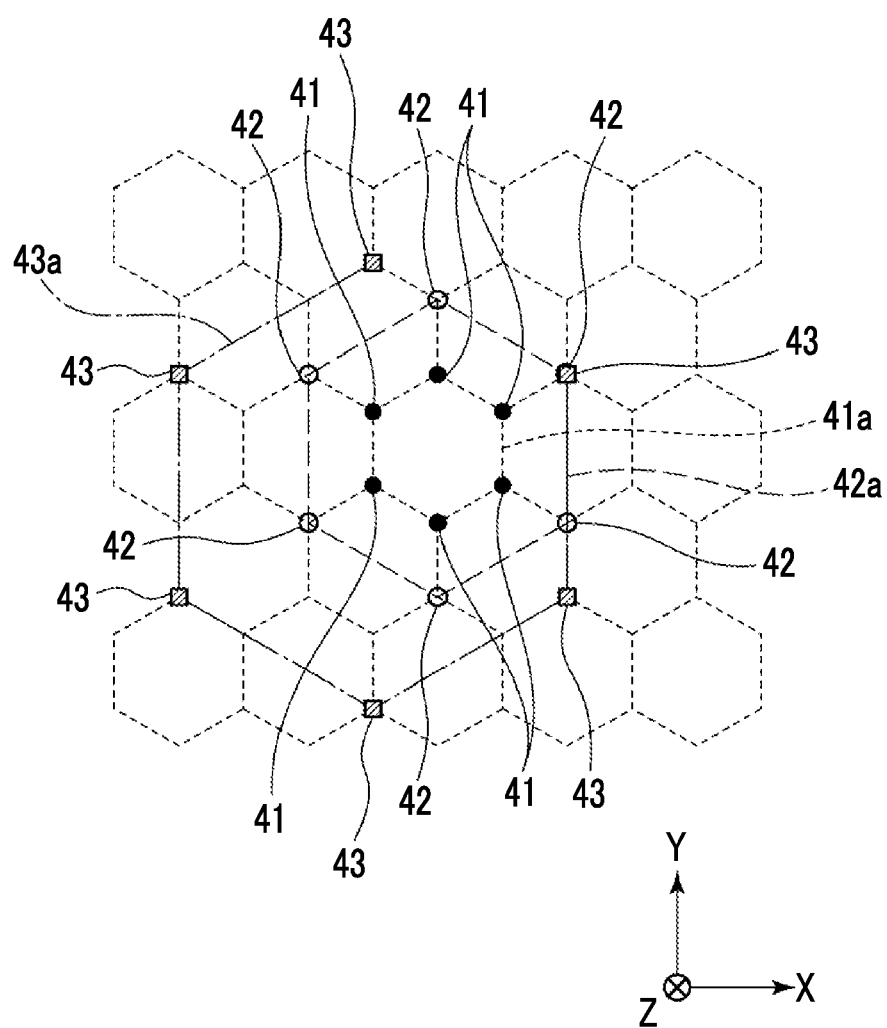
FIG. 3 is an illustrative diagram illustrating a pattern formed on a reference surface in the first embodiment.

The holographic elements 24a and 24b are phase-type diffraction gratings, and are conversion means for converting the incident light into predetermined patterns. The holographic elements 24a and 24b diffract the parallel light beams 23L1 and 23L2 to form irradiation light beams 24L1 and 24L2 at predetermined divergence angles as measurement light, respectively, and substantially simultaneously apply the irradiation light beams 24L1 and 24L2 to the reference surface 11. When the reference surface 11 is irradiated with the irradiation light beams 24L1 and 24L2, two regular dot patterns are projected on the reference surface 11. The dot pattern is, for example, a pattern 41a of dots (black circle mark) 41 arranged at vertexes of a hexagonal grating, a pattern 42a of dots (white circle mark) 42 arranged at vertexes of a larger hexagonal grating than that of the pattern 41a, or a pattern 43a of dots (hatched square mark) 43 arranged at vertexes of a much larger hexagonal grating, as illustrated in FIG. 3.

Figure 4:
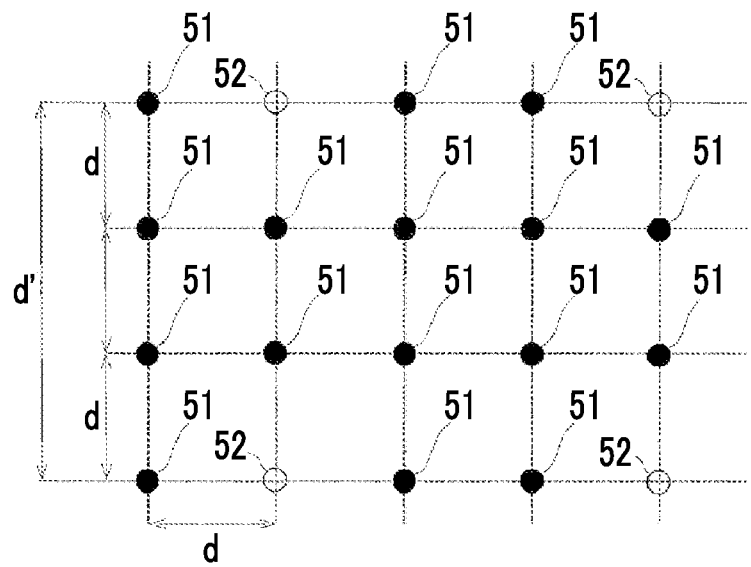
FIG. 4 is an illustrative diagram illustrating another example of the pattern formed on the reference surface.
Figure 4:
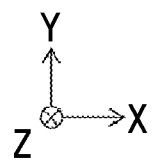

Further, in the dot pattern, first dots (black circles) 51 and second dots (while circles) 52 may be arranged at intersections of a square grating arranged at a uniform pitch d in a row direction and a column direction, as illustrated in FIG. 4. The second dots 52 illustrated in FIG. 4 are arranged for every two of the first dots 51, and arranged at a uniform pitch d' in the row direction and the column direction. Therefore, the pitch d' of the second dots 52 is three times the pitch d of the first dots 51.

Figure 5:
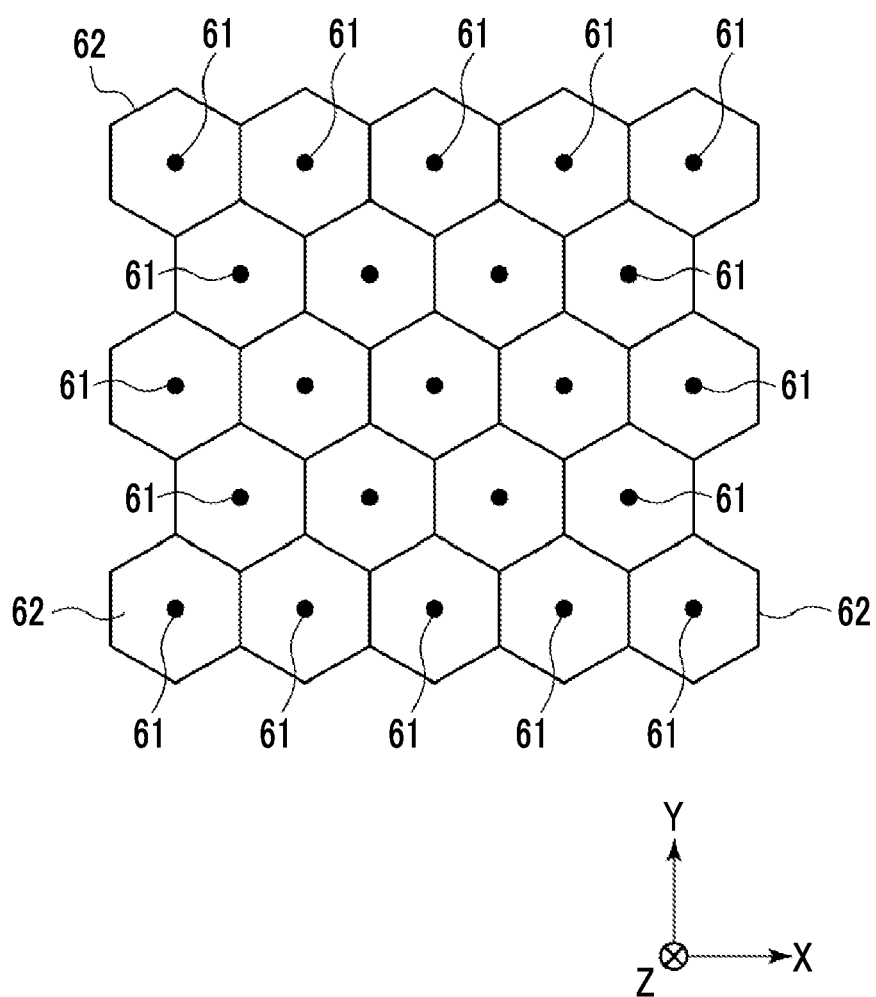
FIG. 5 is an illustrative diagram illustrating yet another example of the pattern formed on the reference surface.

Furthermore, for the holographic elements 24a and 24b, a line pattern having a regular shape may be used in place of the dot pattern or in addition to the dot pattern. For example, as illustrated in FIG. 5, dot patterns 61 arranged at a uniform pitch, and hexagonal grating-like line patterns 62 may be formed on the reference surface 11.

Shapes, sizes, spacing, and the like of the dot patterns or line patterns as described above can be arbitrarily formed according to, for example, a structure of the diffraction surface of the holographic elements 24a and 24b.

Here, "regular" in the dot pattern or the line pattern means that, when attention is paid to any one dot or line, a relative relationship in a direction and a distance between the dot (the line) and a dot (a line) adjacent in each direction is the same in all other dots (lines).

The two dot patterns projected on the reference surface 11 have different luminance, which is a characteristic value, in the reference surface 11, due to different configurations of the diffraction surfaces of the two holographic elements 24a and 24b. It is preferable that this difference in luminance has a size such that the difference is not affected by a change in the intensity of reflected light caused by a detection environment or a shape, a color, or the like of a measured object. For example, the luminance of the dots constituting one of the patterns may be 1.5 to 10 times the luminance of the dots constituting the other pattern.

Further, in the two dot patterns, a difference in at least one of a dot diameter, a shape, brightness, hue, a wavelength, and a phase, instead of the luminance or in addition to the luminance, as a characteristic value of the dots constituting the dot pattern may be generated. For example, filters may be provided near emitting surfaces of the holographic elements 24a and 24b, the reference surface 11 may be irradiated with the emitted light from the holographic elements 24a and 24b through the filters, and accordingly, a difference in the dot diameter, the shape, the brightness, the hue, the wavelength, or the like can be generated.

When the measured object such as a hand of a person enters between the irradiation optical system 20 and the reference surface 11, the irradiation light beams 24L1 and 24L2 are reflected by the measured object. This reflected light is incident on the imaging member 31, as illustrated in FIG. 2, and is imaged by the light reception element included in the imaging member 31. As the light reception element, a charge coupled device (CCD), a complementary metal oxide semiconductor (CMOS), or the like is used. The imaging member 31 can be arranged in any position relative to the irradiation optical system 20 according to object detection accuracy, a detection scheme, or the like. That is, the imaging member 31 may be arranged so that optical axes of the imaging member 31 and the irradiation optical system 20 are substantially the same or may be arranged with a fixed angle therebetween.

As illustrated in FIG. 2, in the imaging member 31, an acquired image is accumulated in the frame memory 32 for each frame. An image of a plurality of frames is accumulated in the frame memory 32, and when an image of a new frame is input, an image of the oldest frame is discarded.

The image for each frame accumulated in the frame memory 32 is sent to the image analysis unit 33, the images of adjacent frames are compared with each other so as to perform analysis to determine which of dot images has moved, and a result of the analysis is sent to the discrimination unit 34. Here, the image analysis unit 33 and the discrimination unit 34 constitute a detection unit that detects a shape, or movement information of the measured object based on the reflected light received by the light reception element.

The discrimination unit 34 discriminates the two dot patterns having different luminance, such as the pattern 41a of the dots 41 and the pattern 42a of the dots 42 in FIG. 3, based on a predetermined threshold for an image output from the image analysis unit 33.

After discriminating the two dot patterns 41a and 42a, the discrimination unit 34 detects the shape of the measured object based on the reflected light in the small dot pattern 41a, and detects the movement information of the measured object based on the reflected light in the large dot pattern 42a. Here, the movement information includes a movement amount or a movement direction in a plane corresponding to the reference surface 11 for each of the plurality of dots 42 of the dot pattern 42a.

A combination of the two dot patterns used for detection is not limited to the two dot patterns 41a and 42a described above. For example, the dot pattern 41a may be used for detection of the shape of the measured object, and the dot pattern 43a larger than the dot pattern 41a may be used for detection of the movement information of the measured object.

Thus, by causing dot spacing of the dot pattern 42a for detecting the movement information to be larger than that of the dot pattern 41a for detecting the shape of the measured object, it is possible to reliably detect the movement information of the measured object even when the measured object moves by more than a predetermined amount, such as an amount larger than a spacing of the dots 41.

Here, when the dot pattern illustrated in FIG. 4 is used, it is possible to obtain the same effects as those when the dot pattern illustrated in FIG. 3 is used, by detecting the shape of the measured object using the reflected light in the first dots 51 between which the dot spacing is small, and detecting the movement information of the measured object using the reflected light in the second dots 52 between which the dot spacing is great.

Further, when the dot pattern and the line pattern illustrated in FIG. 5 are used, it is possible to obtain the same effects as those when the dot pattern illustrated in FIG. 3 is used, by detecting the shape of the measured object using the reflected light in a dot pattern 61 having a small area, and detecting the movement information of the measured object using the reflected light in a line pattern 62 arranged over a wide range.

In the object detection device of the first embodiment, the image is acquired by the imaging member 31 in a state in which the dot pattern is projected on the reference surface 11. This image for each frame is accumulated in the frame memory 32. In the image analysis unit 33, the images of adjacent frames are compared to each other and analysis is performed to determine which of the dots has moved. The analysis of the movement of the dot is performed, for example, based on a moving distance of the dot on an epipolar line using the fact that movement of the dot image caused by entrance of the measured object between the irradiation optical system 20 and the reference surface 11 or movement of the measured object present between the irradiation optical system 20 and the reference surface 11 occurs on an epipolar line passing through a dot image in a first frame while an image of a second frame following the first frame is being acquired.

Hereinafter, a modification example will be described.

Figure 6:
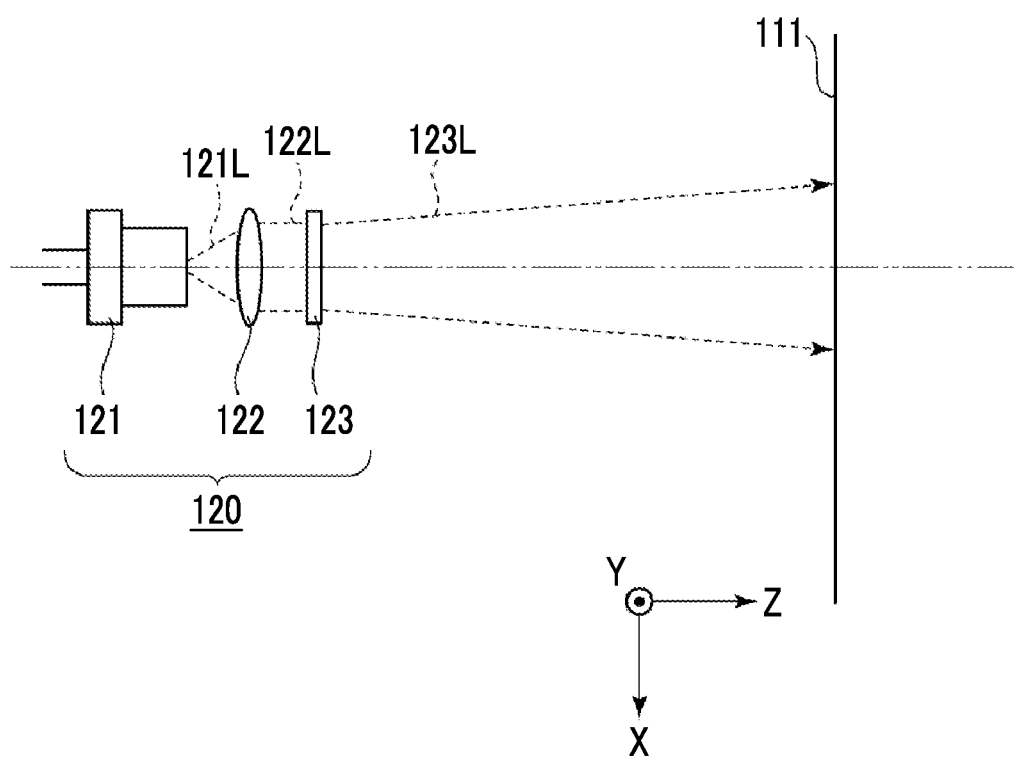
FIG. 6 is a plan view illustrating a light source and an irradiation optical system according to a modification example of the first embodiment.

In the object detection device illustrated in FIG. 1, the parallel light beam 22L is split into the two beams by the beam splitter 23 of the irradiation optical system 20, and two dot patterns are generated using the light beams, whereas the two dot patterns are generated using one holographic element 123, as illustrated in FIG. 6. The reception of the reflected light from the measured object or the detection of the measured object is performed by the imaging member 31, the frame memory 32, the image analysis unit 33, and the discrimination unit 34 illustrated in FIG. 2, similar to the embodiment described above.

The object detection device according to this modification example includes an irradiation optical system 120 and a reference surface 111 illustrated in FIG. 5. The reference surface 111 has the same configuration as the reference surface 11 of FIG. 1. This irradiation optical system 120 includes a laser light source 121 that is a coherent light source, a collimating lens 122 that converts a divergent light beam 121L emitted from the laser light source 121 into a parallel light beam 122L, and a transmission-type holographic element 123 on which the parallel light beam 122L converted by the collimating lens 122 is incident.

The holographic element 123 is a phase-type diffraction grating, and is conversion means for converting the incident light into a predetermined pattern. The holographic element 123 diffracts the parallel light beam 122L, generates an irradiation light beam 123L having a predetermined divergence angle as measurement light, and applies the irradiation light beam 123L to the reference surface 111. When the reference surface 111 is irradiated with the irradiation light beam 123L, a plurality of dots or lines are substantially simultaneously projected on the reference surface 111. The dots or lines form a plurality of regular patterns as illustrated in FIG. 3, 4 or 5. These plurality of patterns have different characteristic values, such as luminance. In the plurality of patterns, a difference in a characteristic value is generated by changing the configuration of the diffraction surface of the holographic element 123. When there are two patterns, the holographic element 123 includes a first grating shape corresponding to one dot pattern, and a second grating shape corresponding to the other dot pattern, as a diffractive surface.

According to this modification example, it is possible to realize a simpler and smaller configuration than the irradiation optical system 20 illustrated in FIG. 1.

Second Embodiment

Next, a second embodiment of the present invention will be described with reference to FIG. 7. The second embodiment is different from the first embodiment in that there are two light sources. Since the reception of the reflected light from the measured object or the detection of the measured object is performed by the imaging member 31, the frame memory 32, the image analysis unit 33, and the discrimination unit 34 illustrated in FIG. 2, similar to the first embodiment, detailed description thereof will be omitted.

Figure 7:
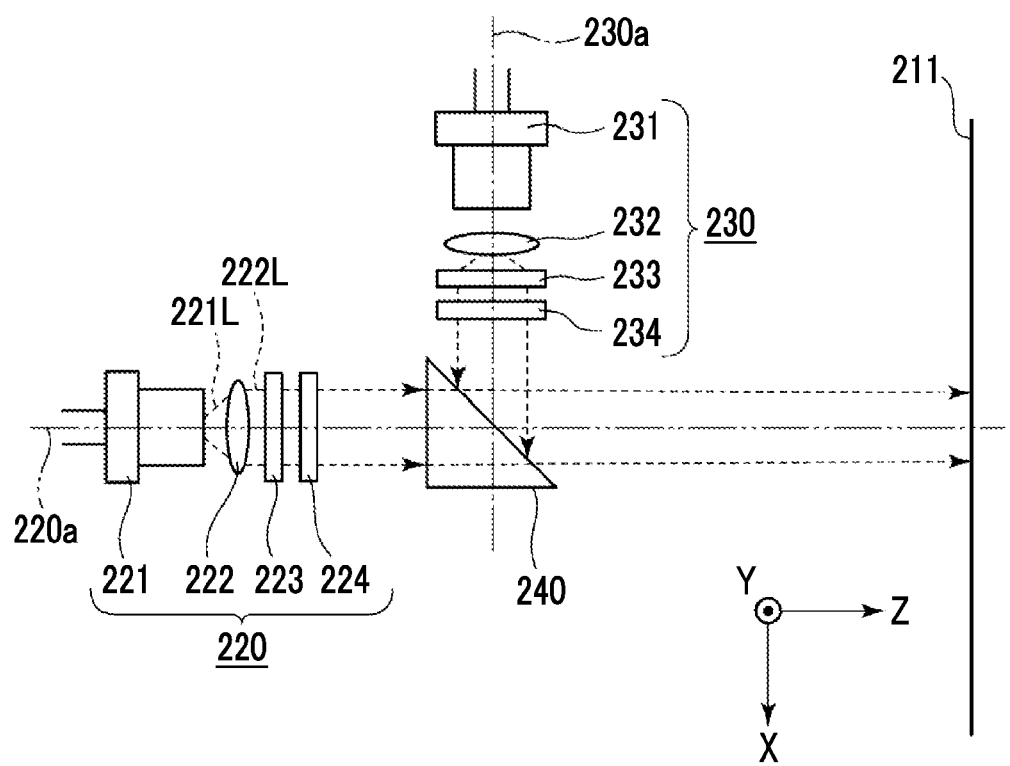
FIG. 7 is a plan view illustrating a light source and an irradiation optical system in a second embodiment.

The object detection device according to the second embodiment includes two irradiation optical systems 220 and 230, a half mirror 240, and a reference surface 211 illustrated in FIG. 7, and the imaging member 31, the frame memory 32, the image analysis section 33, and the discrimination unit 34 illustrated in FIG. 2. The reference surface 211 has the same configuration as the reference surface 11 illustrated in FIG. 1.

The first irradiation optical system 220 includes a first laser source 221 that is a coherent light source, a first collimating lens 222 that converts a divergent light beam 221L emitted from the first laser light source 221 into a parallel light beam 222L, a first mask 223 on which the parallel light beam 222L converted by the first collimating lens 222 is incident, and a first holographic element 224 of a transmission type on which the light beam emitted from the first mask 223 is incident. The first mask 223 shields a part of the incident parallel light beam 222L and transmits the other so that the emitted light is incident on a predetermined position of the first holographic element 224.

The second irradiation optical system 230 has the same configuration as the first irradiation optical system 220, and includes a second laser light source 231, a second collimating lens 232, a second mask 233, and a second holographic element 234 corresponding to the first laser light source 221, the first collimating lens 222, the first mask 223, and the first holographic element 224, respectively. An optical axis 230a of the second irradiation optical system 230 is perpendicular to an optical axis 220a of the first irradiation optical system 220, and the reference surface 211 is arranged to be perpendicular to the optical axis 220a of the first irradiation optical system 220.

The laser light sources 221 and 231 emit laser light in a near infrared wavelength region which is not visible to a person. Alternatively, the laser light sources 221 and 231 may be laser light sources which emit visible laser light. The holographic elements 224 and 234 are phase-type diffraction gratings, and are conversion means for converting the incident light into predetermined patterns. The holographic elements 224 and 234 diffract the incident parallel light beams to generate irradiation light beams at predetermined divergence angles as measurement light, respectively.

The irradiation light beam generated by the first holographic element 224 is transmitted through the half mirror 240, and the reference surface 211 is irradiated with the irradiation light beam. The irradiation light beam generated by the second holographic element 234 is totally reflected by the half mirror 240, and the reference surface 211 is irradiated with the irradiation light beam. By these irradiation light beams, two regular patterns are projected on the reference surface 211. This pattern is, for example, a dot pattern or a line pattern, as illustrated in FIG. 3, 4 or 5.

In the two patterns projected on the reference surface 211, a difference in luminance in the reference surface 211 as the characteristic value is generated, similar to the first embodiment, by causing the configurations of the diffraction surfaces of the two holographic elements 224 and 234 to be different from each other.

Further, the emissions of the light beams from the two irradiation optical systems 220 and 230 may be performed simultaneously or may be performed with a time difference according to a timing of processing of a detection item.

Other configurations, operations, and effects are the same as those in the first embodiment. Further, three or more irradiation optical systems may be provided, and the patterns generated by the respective irradiation optical systems, and characteristic values of dots or lines constituting the pattern may be different.

While the present invention has been described with reference to the above embodiments, the present invention is not limited to the above embodiments, and improvements or modifications can be made within the object of the improvements or the scope of the spirit of the present invention.

As described above, the object detection device according to the embodiment of the present invention is useful for detection of, for example, the movement information of the measured object, as well as the shape of the measured object.

It should be understood by those skilled in the art that various modifications, combinations, sub-combinations and alterations may occur depending on design requirements and other factors insofar as they are within the scope of the appended claims of the equivalents thereof.

What is claimed is:

1. An object detection device comprising:
   at least one light source;
   an irradiation optical system configured to irradiate an object to be measured with light emitted from the light source, the object to be measured reflecting the light;
   a light reception element configured to receive the light reflected by the measured object; and
   a detection unit configured to detect the object to be measured based on the light received by the light reception element,
   wherein the irradiation optical system includes a conversion unit configured to convert the light emitted from the light source into at least one light beam having a plurality of patterns, the plurality of patterns including a first pattern having a first predetermined pitch when irradiated on a reference surface, and a second pattern having a second predetermined pitch greater than the first predetermined pitch when irradiated on the reference surface,
   and wherein the conversion unit generates the at least one light beam by superimposing the first and second patterns.

2. The object detection device according to claim 1, wherein the plurality of patterns are all dot patterns, dots forming one of the plurality of patterns having at least one characteristic having a value different from that of dots forming another pattern.

3. The object detection device according to claim 1, wherein the plurality of patterns include a dot pattern and a line pattern.

4. The object detection device according to claim 3, wherein dots of the dot pattern and lines of the line pattern have at least one characteristic having different values.

5. The object detection device according to claim 2, wherein the at least one characteristic is at least one of luminance, a dot diameter, a shape of the dots, brightness, hue, a wavelength, and a phase.

6. The object detection device according to claim 1, wherein the at least one light source consists of a single light source, and the conversion unit includes a diffraction grating configured to diffract incident light.

7. The object detection device according to claim 6, further comprising:
a light splitter configured to split the light emitted from the single light source into a plurality of light beams,
wherein the plurality of light beams are respectively incident on the plurality of diffraction gratings.

8. The object detection device according to claim 7, wherein the light splitter includes a beam splitter.

9. The object detection device according to claim 6, wherein the diffraction grating diffracts the incident light to generate a plurality of different dot patterns.

10. The object detection device according to claim 1, wherein the at least one light source includes two light sources, and the conversion unit includes two diffraction gratings configured to diffract incident light from the two light sources, respectively.

11. The object detection device according to claim 6, wherein the diffraction grating includes a holographic element.

12. The object detection device according to claim 1, wherein the detection unit detects a first detection item of the object to be measured using a first light beam having the first pattern, and detects a second detection item of the object to be measured using a second light beam having the second pattern.

13. The object detection device according to claim 2,
wherein the detection unit detects a first detection item of the object to be measured using a first light beam having the first pattern, and detects a second detection item of the object to be measured using a second light beam having the second pattern,
and wherein the detection unit includes a discrimination unit configured to discriminate the dots of the first pattern from the dots of the second pattern based on the at least one characteristic.

14. The detection device according to claim 12, wherein the first detection item includes a shape of the object to be measured, and the second detection item includes movement information of the object to be measured.

* * * * *